United States Patent
Asao (10) Patent No.: US 7,505,090 B2
(45) Date of Patent: Mar. 17, 2009

(54) ECB-TYPE COLOUR LIQUID CRYSTAL DISPLAY WITH RESTRAINED TEMPERATURE DEPENDENCY OF COLOUR TONE

(75) Inventor: Yasufumi Asao, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 721 days.

(21) Appl. No.: 10/542,631

(22) PCT Filed: Jun. 24, 2004

(86) PCT No.: PCT/JP2004/009285

§ 371 (c)(1),
(2), (4) Date: Jul. 19, 2005

(87) PCT Pub. No.: WO2005/006070

PCT Pub. Date: Jan. 20, 2005

(65) Prior Publication Data

US 2008/0106655 A1    May 8, 2008

(30) Foreign Application Priority Data

Jul. 9, 2003    (JP) .............................. 2003-194590

(51) Int. Cl.
G02F 1/137 (2006.01)
G02F 1/1335 (2006.01)
G02F 1/1347 (2006.01)
(52) U.S. Cl. ............................ 349/33; 349/78; 349/118
(58) Field of Classification Search ....................... None
See application file for complete search history.

(56) References Cited

U.S. PATENT DOCUMENTS

| 5,570,211 A | 10/1996 | Hanaoka et al. ................ 359/53 |
| 5,680,184 A | 10/1997 | Nishino ........................ 349/78 |
| 5,750,214 A | 5/1998 | Ito et al. ........................ 428/1 |
| 5,796,378 A | 8/1998 | Yoshida et al. ................ 345/88 |

(Continued)

FOREIGN PATENT DOCUMENTS

JP    04-188113    7/1992

OTHER PUBLICATIONS

Jan. 9, 2006 International Preliminary Report on Patentability in PCT/JP2004/009285.

(Continued)

*Primary Examiner*—Tina M Wong
(74) *Attorney, Agent, or Firm*—Fitzpatrick, Cella, Harper & Scinto (57) ABSTRACT

A liquid crystal display device including a polarizing plate, a pair of substrates at least one of which is transparent, a pair of electrodes, and a nematic liquid crystal. The crystal is filled between the substrates, is aligned to be substantially perpendicular to the substrates when applying a voltage not higher than a threshold value between the electrodes, has negative dielectric constant anisotropy, and undergoes a change in tilt angle of alignment with respect to the substrates in accordance with applied voltage when applying a voltage not lower than a threshold value between the electrodes. The device has a voltage range in which the rate of change in retardation level with respect to temperature is substantially zero, and displays red or purple when voltage is applied at the maximum voltage value in the voltage range. According thereto, changes in color tone depending on temperature are restrained.

6 Claims, 10 Drawing Sheets

U.S. PATENT DOCUMENTS

| | | | |
|---|---|---|---|
| 5,858,273 A | 1/1999 | Asaoka et al. | 252/299.4 |
| 5,932,136 A | 8/1999 | Terada et al. | 252/299.01 |
| 6,083,574 A | 7/2000 | Asao et al. | 428/1.1 |
| 6,122,031 A | 9/2000 | Terada et al. | 349/155 |
| 6,128,064 A | 10/2000 | Moriyama et al. | 349/173 |
| 6,139,927 A | 10/2000 | Takao et al. | 428/1.26 |
| 6,195,147 B1 | 2/2001 | Asao et al. | 349/133 |
| 6,310,677 B1 | 10/2001 | Togano et al. | 349/172 |
| 6,577,289 B1 | 6/2003 | Asao et al. | 345/87 |
| 6,636,193 B1 | 10/2003 | Asao et al. | 345/96 |
| 6,650,387 B1 | 11/2003 | Asao et al. | 349/133 |
| 6,710,842 B2 | 3/2004 | Munakata et al. | 349/172 |
| 6,757,045 B1 | 6/2004 | Asao et al. | 349/172 |
| 6,809,717 B2 | 10/2004 | Asao et al. | 345/102 |
| 2004/0239612 A1 | 12/2004 | Asao et al. | 345/102 |
| 2005/0243047 A1 | 11/2005 | Asao | 345/88 |
| 2005/0248714 A1 | 11/2005 | Asao | 349/179 |
| 2006/0055713 A1 | 3/2006 | Asao et al. | 345/690 |

OTHER PUBLICATIONS

F. Clerc, "Electro-Optical Limits of the Electrically Controlled Birefringence Effect in Nematic Liquid Crystals," Displays, vol. 2 (1981), No. 7, Guildford, Surrey, Great-Britain, pp. 341-347.

Noboru Ohta, "Shikisai Kogaku (Color Optics)", p. 116.

FIG. 11 ant_header"></a>

ECB-TYPE COLOUR LIQUID CRYSTAL DISPLAY WITH RESTRAINED TEMPERATURE DEPENDENCY OF COLOUR TONE

TECHNICAL FIELD

This invention relates to a liquid crystal display device, and more particularly relates to a liquid crystal display device of an ECB type (electrically controlled birefringence effect type).

BACKGROUND ART

Nowadays, liquid crystal display devices are in widespread use in various monitors for personal computers or the like, display devices for cellular phones, and so forth, and are expected to increasingly spread hereafter, and in fact, it is being planned to develop their use in large-screen television sets. In such liquid crystal display devices, what is called a micro color filter system is widely used as a color display system.

With this system, one pixel is divided into at least three subpixels, for each of which red, green and blue color filters are formed to perform full-color display. This system has such an advantage that high color reproduction performance can be materialized with ease. However, in this system, there is a disadvantage such that transmittance comes to be ⅓ so that light utilization efficiency is lowered.

In such a low light utilization efficiency, a problem is raised in that it is necessary to increase the luminance of a back light or a front light in an attempt to achieve bright display so that visibility can be improved, resulting in a high power consumption, in the case of a transmission type liquid crystal display device or semi-transmission type liquid crystal display device having a back light, or a reflection type liquid crystal display device having a front light.

That low light utilization efficiency results in a more serious problem in the case of a reflection type liquid crystal display device making use of no front light. That is, a reflection type liquid crystal display device having RGB color filters can secure sufficient visibility in the very bright outdoors, but it is difficult to secure sufficient visibility in dark places and even in an environment of offices or homes.

Meanwhile, as a color liquid crystal display device which performs display without use of any color filters, the liquid crystal display device of an ECB type (electrically controlled birefringence effect type) is conventionally known in the art.

This ECB type liquid crystal display device includes a transmission type in which a liquid crystal cell holding a liquid crystal is interposed between a pair of substrates and a polarizing plate is disposed on each of its front side and back side, and a reflection type including a single polarizing plate type in which the polarizing plate is disposed only on one substrate, and a double polarizing plate type in which the polarizing plate is disposed on both the substrates and a reflecting plate is provided on the outside of one polarizing plate.

Here, in the case of, e.g., the transmission type ECB type liquid crystal display device, the linear polarization transmitted through one polarizing plate to have entered becomes light, each wavelength light of which has turned to elliptical polarization in a different polarization state by the birefringent action of a liquid crystal layer while being transmitted through the liquid crystal cell. This light enters the other polarizing plate, and the light transmitted through the other polarizing plate becomes colored light in a color corresponding to the ratio of light intensity of each wavelength light which constitutes that light.

That is, the ECB type liquid crystal display device colors light by utilizing the birefringent action of a liquid crystal layer of the liquid crystal cell and the polarization action of at least one polarizing plate. Since it is free of absorption of light that takes place when color filters are used, it can perform bright color display at high light transmittace.

Moreover, the ECB type liquid crystal display device varies in birefringence of the liquid crystal layer depending on the state of alignment of liquid crystal molecules in accordance with the voltage applied across the electrodes of both the substrates of the liquid crystal cell. Following such variations, the polarization state is varied with each wavelength light entering the other polarizing plate, so that the color of colored light can be changed by controlling the voltage applied to the liquid crystal cell. Thus, a plurality of colors can be displayed in the same pixel.

Figure 10:
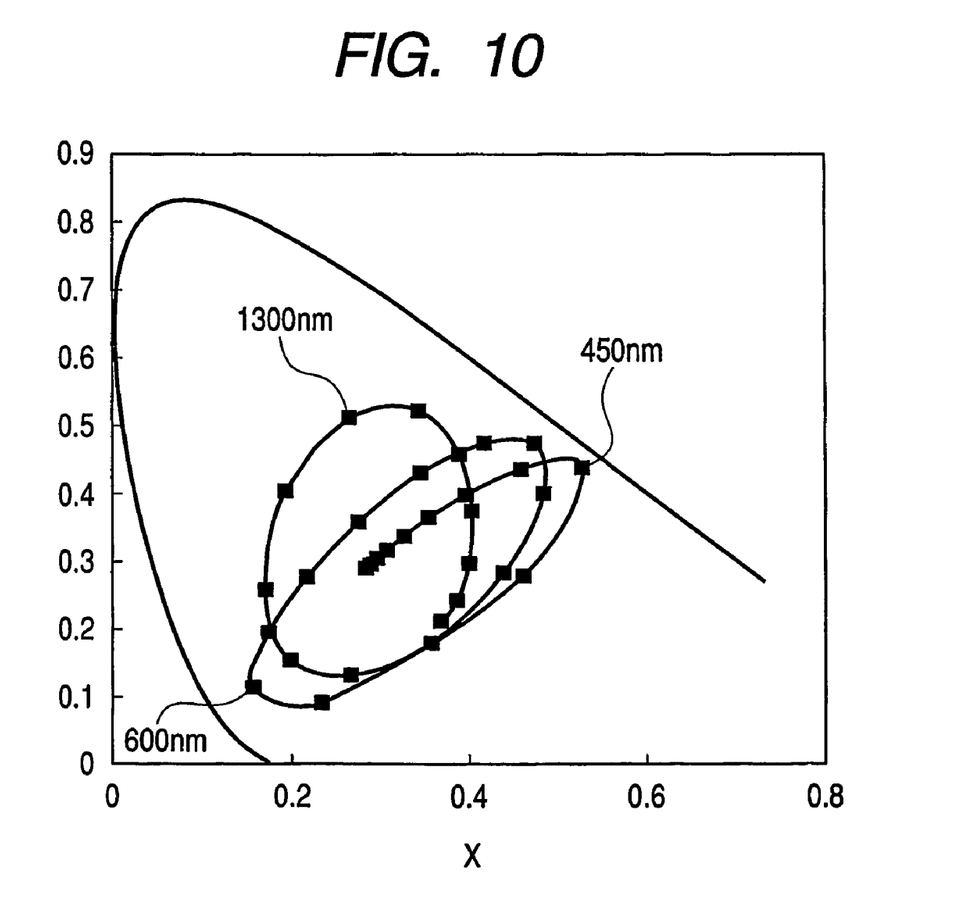
FIG. 10 is a graph showing changes in color with changes in retardation level of a conventional liquid crystal display device.

FIG. 10 is a view showing retardation levels and colors corresponding thereto where the ECB type liquid crystal display device is driven under crossed Nicol (cross polarization). As shown in FIG. 10, colors change in accordance with birefringence levels. Here, when using as a liquid crystal mode, e.g., a material having negative $\Delta\epsilon$ which stands perpendicularly aligned when no voltage is applied is used, black is displayed when no voltage is applied, and colors are so changed as to be black→gray→white→yellow→red→purple→blue→yellow→purple→light blue→green with an increase in voltage.

However, the ECB type liquid crystal display device can display any desired colors in the same pixel, but has such a problem that because of its mode that utilizes the coloring relying on retardation, display colors may be varied with changes in retardation.

DISCLOSURE OF THE INVENTION

The present invention is a liquid crystal display device which comprises at least one polarizing plate, a pair of substrates at least one of which is transparent, and a liquid crystal layer of nematic liquid crystal having negative dielectric constant anisotropy which is filled between the substrates and is aligned to be substantially perpendicular to the substrates when no voltage is applied; and performs monochrome and color displays by changing a retardation level R of the liquid crystal layer by controlling a tilt angle of molecular alignment of the liquid crystals by applying a voltage; the device being characterized in that in the liquid crystal layer, a voltage range is present in which the rate of change in the retardation level R with respect to temperature T, $\Delta R/\Delta T$, becomes substantially zero under conditions of application of a voltage not lower than the threshold value of the Freedericksz transition and the color displayed when voltage is applied at a maximum voltage value in the voltage range is red or purple.

The present invention is also characterized in that the color displayed when voltage is applied at a maximum voltage value in the voltage range is present in a display region corresponding to red or purple in the xy chromaticity coordinates.

The present invention is still also characterized in that the color displayed when voltage is applied at a maximum voltage value in the voltage range is present in the region that satisfies two expressions, $x>0.4$ and $y<0.45$, in the xy chromaticity coordinates.

The present invention is further characterized by having a liquid crystal element which is provided with the substrates and the liquid crystal layer and has a large number of pixels, and in which a green color filter is used at a portion of each subpixel constituting the pixels.

The present invention is still further characterized in that the display is a black display when no voltage is applied.

BEST MODES FOR PRACTICING THE INVENTION

Embodiments of the present invention are described below in detail.

Figure 1:
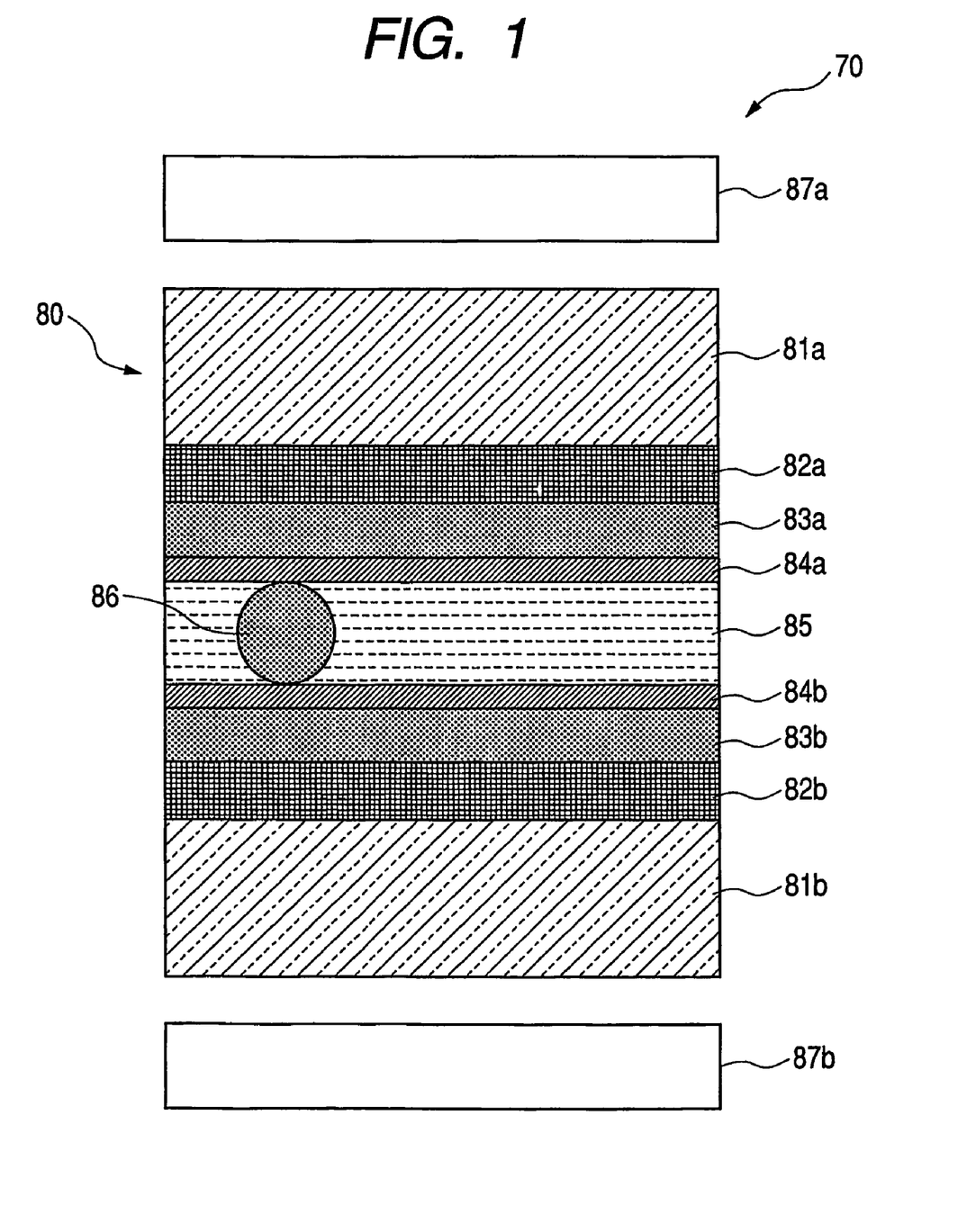
FIG. 1 is a sectional view showing the structure of a liquid crystal display device according to an embodiment of the present invention.

FIG. 1 is a sectional view showing the structure of a liquid crystal display device according to an embodiment of the present invention. In FIG. 1, reference numeral 70 denotes the liquid crystal display device; and 80, a liquid crystal element held between a pair of polarizing plates 87a and 87b whose polarizing axes cross each other at right angles. This liquid crystal element 80 is formed by filling nematic liquid crystals (hereinafter simply "liquid crystal") 85 between a pair of substrates 81a and 81b formed of a highly transparent material such as glass or plastic.

Here, these substrates 81a and 81b are provided with electrodes 82a and 82b formed of a material such as ITO (indium-tin oxide) which are each for applying a voltage to liquid crystals (layer) 85.

In addition, the electrodes may have an active matrix structure constituted of dot-like transparent electrodes disposed in matrix form on one substrate, switching elements such as TFTs (thin-film transistors), MIM (metal-insulator-metal) elements or the like which are connected to the respective transparent electrodes, and counter electrodes provided in a given pattern on one side of the other substrate.

On these electrodes 82a and 82b, respectively, insulating films 83a and 83b may be optionally provided which have the function of, e.g., preventing these electrodes from being short-circuited. On the insulating films 83a and 83b, alignment control files 84a and 84b are further provided which are kept in contact with the liquid crystal 85 and function to control the alignment state.

A liquid crystal display device 70 making use of a usual ECB mode can perform RGB three-primary color display by utilizing changes in retardation. Color liquid crystal display devices utilizing it are known in the art.

Here, as modes in which color display based on such an ECB principle is possible, various alignment modes such as a perpendicular alignment mode, a parallel alignment mode, a HAN (hybrid aligned nematic) mode and a bend (OCB) mode may be conceived from the state of alignment of liquid crystal molecules brought about when no voltage is applied. Any of these are an alignment mode in which the retardation level of the liquid crystal layer is changed by application of voltage.

The present inventor has made extensive studies on modes among these. As a result, it has come to light that the perpendicular alignment mode is best in order to minimize changes in display color due to changes in temperature. The details thereof are described below.

In the case of nematic liquid crystals, various values of physical properties are changed with respect to temperature. In particular, as a physical-property parameter which influences display, the refractive-index anisotropy ($\Delta n$) is known to have a great temperature dependence. As examples in which changes in characteristics due to temperature dependence of such a physical-property value are remarkably perceivable by human eyes, the following two examples may be given.

1. A case in which a contrast ratio has temperature dependence.

2. A case in which a color tone of display color with high visual sensitivity (luminosity factor) characteristics has temperature dependence.

In the perpendicular alignment mode, the present invention minimizes the above two temperature dependences simultaneously by employing the constitution and drive conditions described below.

First, the temperature dependence of the contrast ratio is primarily governed by temperature dependence of black luminance. This black luminance can be made free of temperature dependence by providing a perpendicular alignment and normally black constitution, i.e., by making a black display when no voltage is applied. More specifically, in the state that liquid crystal molecules are upright when no voltage is applied, no birefringence occurs.

That is, although the $\Delta n$, a physical-property value of the liquid crystals, has the temperature dependence, the liquid crystals are in the state of perpendicular alignment, and hence its birefringence level is always zero even when the temperature is changed. By setting this state to be the black state, it is possible to provide the constitution that the black luminance is not changed due to temperature.

On the other hand, the modes other than the perpendicular alignment, such as the above parallel alignment mode, HAN mode and bend (OCB) mode, the retardation of the liquid crystal layer is present when no voltage is applied, and hence it follows that the temperature dependence of the $\Delta n$ directly influences optical characteristics.

Next, consideration is given to the minimization of the temperature dependence of color tones. Described here is the temperature dependence of voltage-retardation characteristics of a liquid crystal material having negative dielectric constant anisotropy (Nn-type liquid crystal) which is used in the perpendicular alignment mode.

With a gradual raise in an applied-voltage value from a state that no voltage is applied, the transformation of alignment begins to arise at a voltage value not lower than the threshold value of the Freedericksz transition. More specifically, liquid crystal molecules come to deviate from perpendicularity with respect to the substrates, and this inclination (gradient) becomes larger with an increase in voltage. With a further rise in the voltage, almost all the molecules of the liquid crystal layer shortly come to be aligned in the direction parallel to the substrates, and no deformation arises any longer. The voltage at this point is called the saturated voltage.

As is well known, this transformation is determined by the voltage, and does not depend on the cell thickness. The angle of inclination $\theta m$ of liquid crystal molecules at the cell middle portion (bulk) may be found by calculation according to the elastic continuum theory. In the calculation made here, it is necessary to know values of physical properties such as the elasticity constant. From the values of alignment state and refractive-index anisotropy thus found, the birefringence level brought about when voltage is applied is found by calculation.

The present inventor has measured the temperature dependence of retardation values of the Nn-type liquid crystal. As a result, the present inventor has discovered that there are materials on which the temperature dependence of retardation values is little seen at a voltage value between the threshold value of the Freedericksz transition and the saturated voltage.

Figure 11:
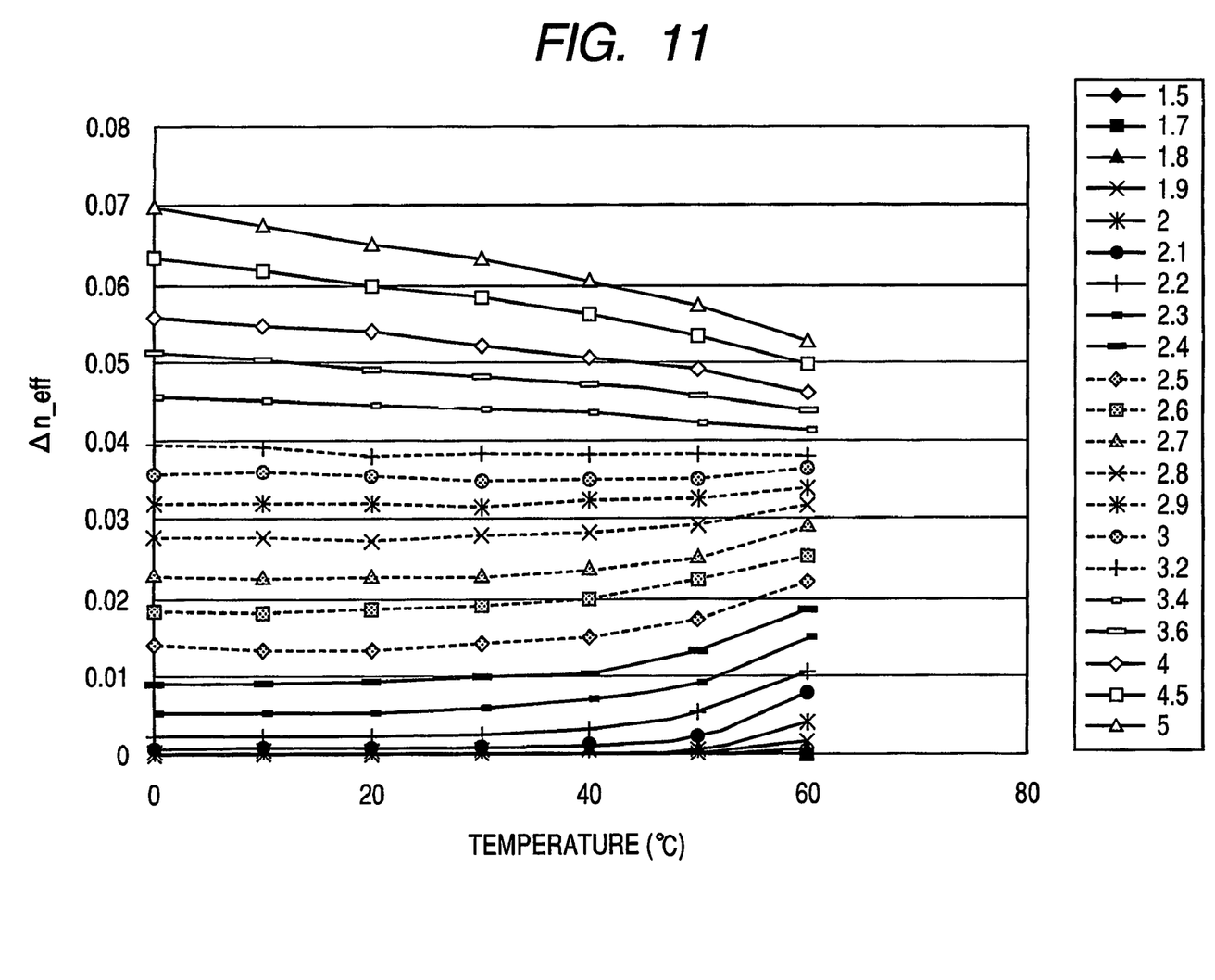
FIG. 11 is a graph showing the results of measurement of the temperature dependence of retardation.

FIG. 11 shows the results of actual measurement thereon. With the value of effective refractive-index anisotropy ($\Delta n$.eff) found by dividing the retardation value by the cell thickness as ordinate and temperature as abscissa, results according to various applied voltages of from 1.5 V to 5 V were plotted.

The retardation values change little in the temperature range of from 0° C. to 60° C. where the voltage is in the range of from 2.9 V to about 3.2 V. When viewed in the range of from 0° C. to about 35° C., which is an actual-service temperature range, the voltage range in which the retardation can be deemed to be free of the temperature dependence can be said to be from 0 V to about 4 V.

Although these liquid crystal materials have temperature dependence on the $\Delta n$ of the liquid crystal materials themselves, it is presumed that the temperature dependence of the elasticity constant that influences the alignment transformation has cancelled the temperature dependence of the $\Delta n$, so that the voltage range has been materialized in which the temperature dependence of the retardation level is very small or does not substantially exist.

On the other hand, with regard to the above materials as well, it can be seen also from FIG. 11 that the retardation value in the voltage range close to the value of saturated voltage shows a very large temperature dependence. This is considered as follows: upon application of sufficiently high voltage, almost all the liquid crystal layer extending from the bulk to the interfaces has been aligned in the direction parallel to the substrates, so that it is directly influenced by the temperature dependence of the $\Delta n$, and the temperature dependence of the retardation level as a consequence becomes very large.

That is, the temperature dependence of the retardation level is very small at an intermediate voltage, and the temperature dependence of the retardation is remarkable at high voltage.

Accordingly, the voltage range in which the temperature dependence of the retardation level is small can be preferably utilized in order to perform color display having small temperature dependence.

In practice, however, the condition that the retardation changes little due to temperature is often limited to a narrow voltage range. In such a case, a voltage must be applied which can make the temperature dependence small only in specific colors and is compatible with temperatures at the time of displaying other colors.

In such a case, red or purple may preferably be displayed at the maximum voltage among voltages where changes are small so that the color tone of the red or purple is not changed by temperature.

The retardation value of blue or green may also be so set that it comes to this voltage range where the temperature dependence is small. However, the red or purple has a smaller retardation value than the blue or green, and hence the retardation value of the red or purple may be set to the maximum value in this voltage range, whereby the cell thickness can be made smaller in the same voltage range. As a result, the response speed can be increased.

If blue is displayed when the retardation value of the red or purple can be set to the maximum value in this voltage range, the retardation value becomes larger than that of the red or purple results and it is necessary to apply a high voltage, where the temperature dependence of color tone in the blue is brought about, but can be made not so conspicuous in the following way.

Figure 2:
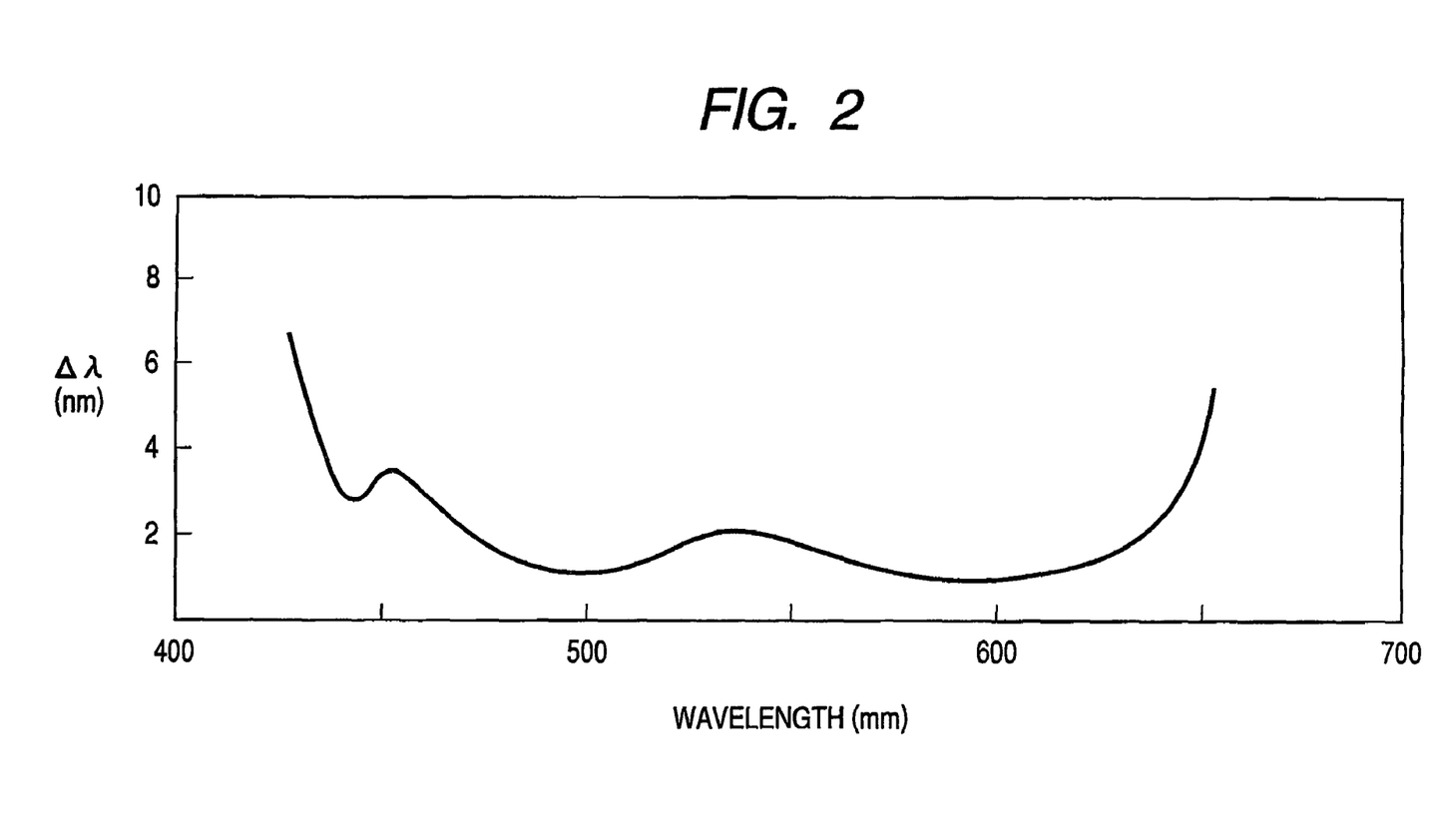
FIG. 2 is a graph showing a color difference threshold Wright and Pitt have found.

FIG. 2 presents a color difference threshold Wright and Pitt have found (Noboru Ohta, "Shikisai Kogaku (Color Optics)", p.116). According to this article, colors of from green to red are perceivable even when the wavelength deviates by 2 nm or less, whereas blue is not perceivable until the wavelength deviates by 4 nm or more. This is considered due to the fact that a human's visual sensitivity (luminosity factor) to blue is not good.

That is, even when the color tone has no temperature dependence in respect of red or purple and has temperature dependence in respect of blue as in the liquid crystal display device of the present invention, the temperature dependence of the blue cannot easily be sensed for the above reason.

Employing the element constitution as described above, it is possible to materialize a multi-color display element which can display monochrome, and red, purple and blue, and a liquid crystal display device 70 (liquid crystal element 80) on which no temperature dependence of color display characteristics is visible.

In addition, in combination with subpixels having green color filters, i.e., using green color filters in some parts of subpixels constituting the pixels, a color display element capable of displaying colors ranging over all the RGB can be produced.

In addition, for driving the liquid crystal element of the present invention, any systems of a direct drive system, a simple matrix system and an active matrix system may be used. The liquid crystal display device 70 may also be of a transmission type, a reflection type, or a semi-transmission type. The substrate used may be a glass substrate or one which has a flexibility, such as a plastic substrate. When the reflection type is employed, various types of reflecting sheets may be used as a reflecting sheet, such as what is called a front scattering sheet type in which a mirror reflecting sheet is used as the reflecting sheet and a scattering sheet is provided on the outside of the liquid crystal layer, and what is called a directivity reflecting sheet, in which the shape of the reflecting sheet is devised to provide directivity.

Examples 1 to 3 of the present embodiment are given below.

As a common element structure used in Examples 1 to 3, the following was used.

As the structure of the liquid crystal layer, two sheets of glass substrates having been subjected to perpendicular alignment were superposed one on another to form a cell, and a liquid crystal material MLC-6608 (available from Merck & Co., Inc.) having $\Delta\epsilon<0$ was capillary-injected thereinto as a liquid crystal material. Here, the cell thickness was changed so as to set retardation values in accordance with Examples.

As the structure of the substrate used, the following were used:

(1) a single-bit test cell for confirming retardation; and
(2) an active-matrix (AM) cell for confirming display characteristics.

Here, as to the single-bit test cell, two sheets of substrates on which a pattern, comprised of squares of ITO wherein each side is 1 cm, was formed were superposed one on another to form a test cell. As for the AM cell, an active-matrix substrate on which TFTs were disposed was used as one substrate, and a substrate on which color filters were disposed in accordance with the Examples was used as the other substrate. In this case, the shape of pixels and the constitution of color filters were changed in accordance with the Examples.

Aluminum electrodes were used as pixel electrodes on the TFT side to make up a reflection type, and a front scattering plate (manufactured by Polatechno Co., Ltd.) was provided on the outermost surface of the substrate to enlarge the visual-field angle. Further, in every cell, JALS2022-R1 (available from JSR Corporation) was used as an aligning film in an aligning film thickness of 100 nm, and this substrate was rubbed to provide a pretilt angle. The pretilt angle was set to about 3 degrees from the normal direction of the substrate.

A broad-band $\lambda/4$ sheet (a phase compensation sheet which can substantially satisfy the $\frac{1}{4}$ wavelength condition in the visible region) was also disposed between the above substrate (color filter substrate) and the polarizing plate. Thus, a normally black constitution was provided in which the liquid crystal display device was in a dark state when no voltage is applied and was in a light state when voltage is applied.

To sum up the constitution used commonly, the basic constitution was the same constitution as that shown in FIG. 1, and the cell thickness and the color filter constitution were changed in accordance with the Examples.

EXAMPLE 1

Using the single-bit test cell, the temperature dependence of retardation level was measured. The cell thickness was set to be four kinds, 3.7 microns, 4.5 microns, 5.8 microns and 9.0 microns.

Figure 3A:
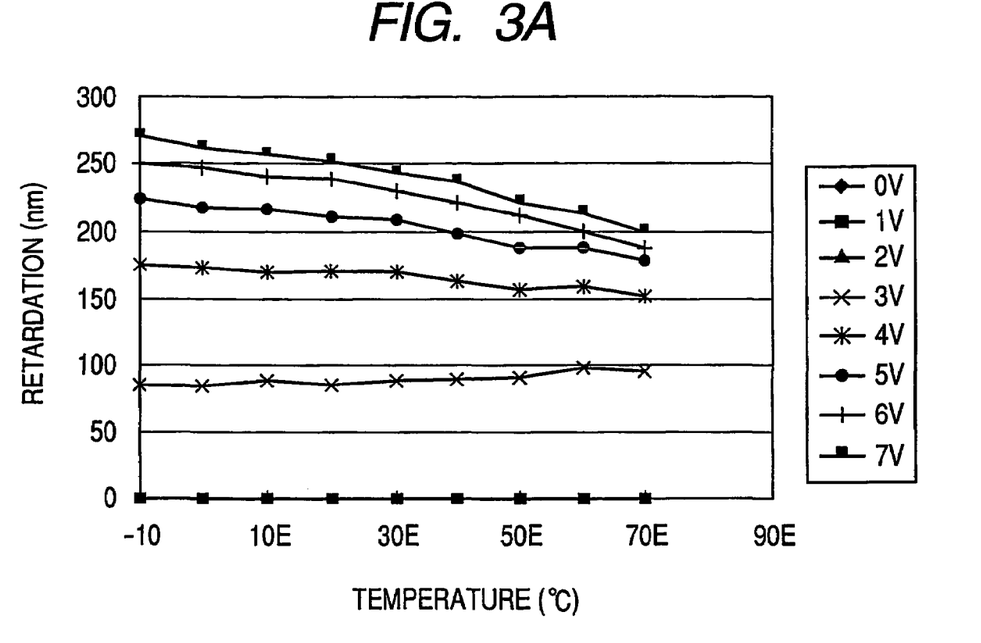
FIGS. 3A and 3B are graphs showing the results of measurement of the temperature dependence of retardation where a liquid crystal element of the liquid crystal display device has a cell thickness of 3.7 microns and 4.5 microns.
Figure 3B:
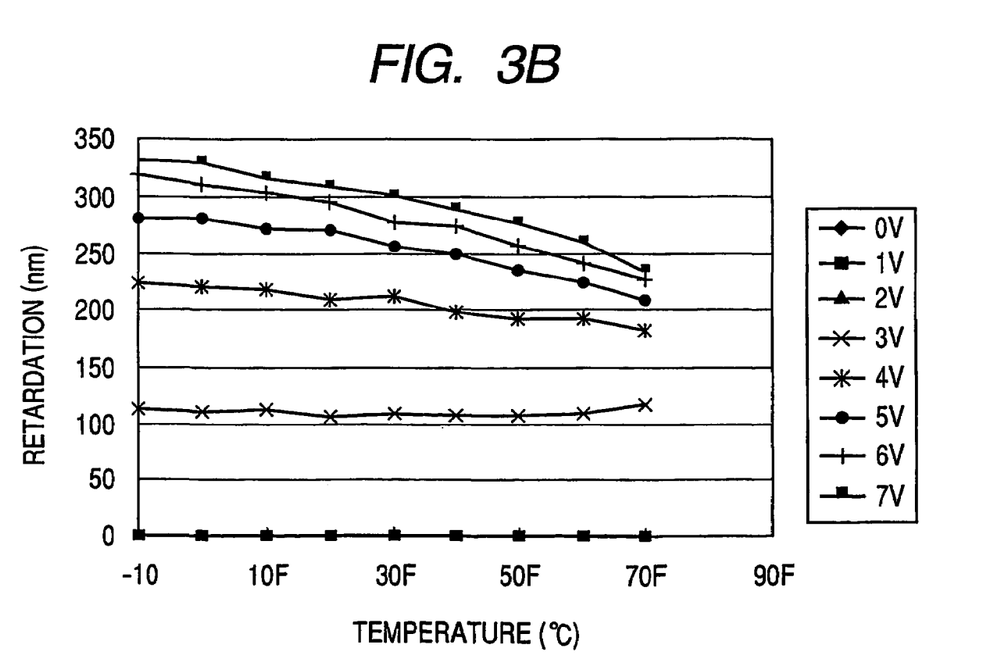
Figure 4A:
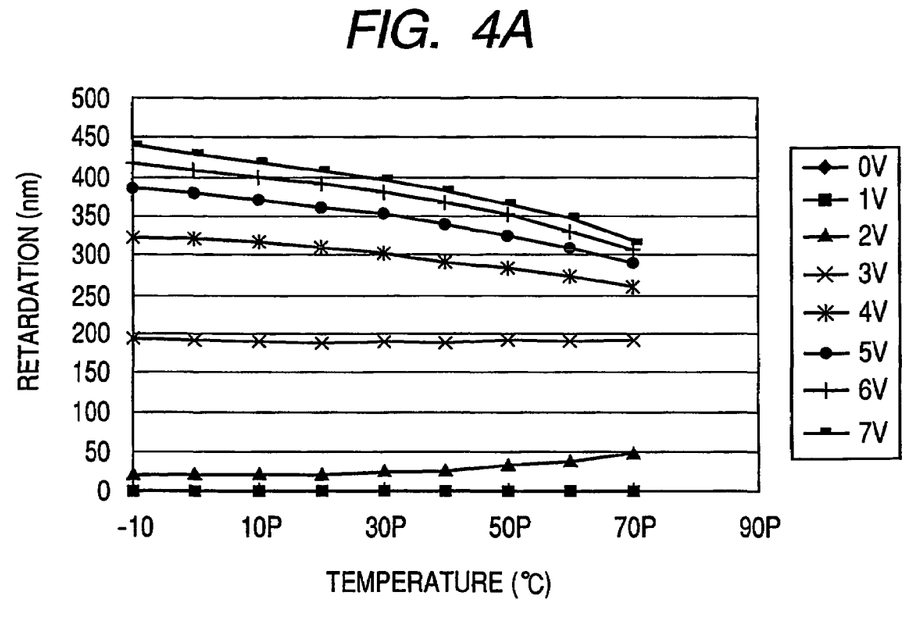
FIGS. 4A and 4B are graphs showing the results of measurement of the temperature dependence of retardation where the cell thickness of a liquid crystal element of the liquid crystal display device is 5.8 microns and 9.0 microns.
Figure 4B:
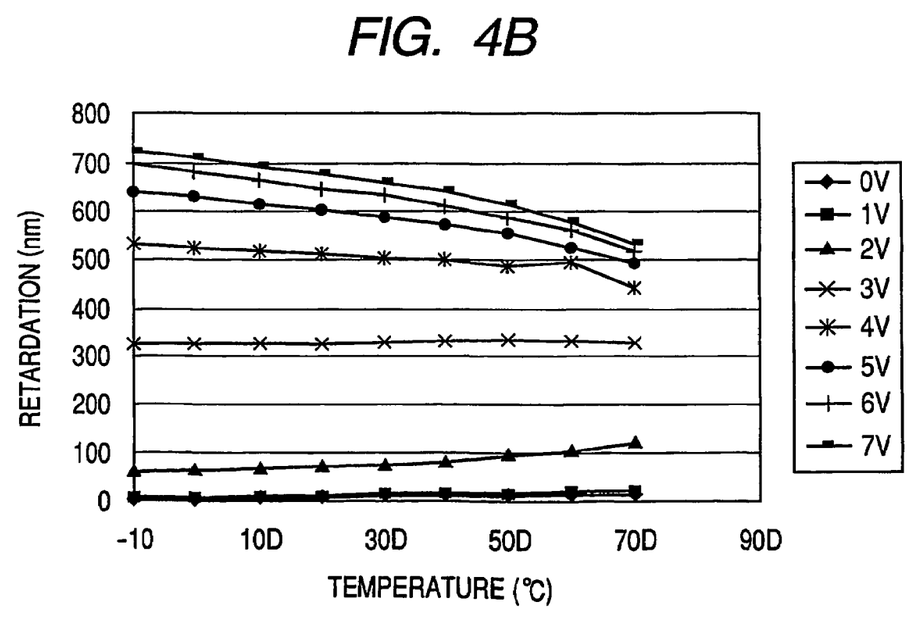

The results are shown in FIG. 3A as those on the cell thickness of 3.7 microns, in FIG. 3B as those on the cell thickness of 4.5 microns, in FIG. 4A as those on the cell thickness of 5.8 microns, and in FIG. 4B as those on the cell thickness of 9.0 microns. As shown in these FIGS. 3A to 4B, it was confirmed that the temperature dependence was not seen at 3 V in the cell having any cell thickness.

That is, it was confirmed in this Example that in the liquid crystal material MLC-6608 having $\Delta\epsilon<0$, there is a voltage range in which the rate of change in the retardation level R with respect to temperature T, $\Delta R/\Delta T$, becomes substantially zero under the conditions that a voltage not lower than the threshold value of the Freedericksz transition is applied, and that the maximum voltage value V1 in that voltage range was about 3 V.

EXAMPLE 2

A substrate of 12 inches in diagonal and having a number of pixels which correspond to SVGA (super video graphics array; 800×600×3) was used as the active-matrix substrate. Also, measurement was carried out at up to 5 V because of restrictions on its driver ICs and at 10° C. to 30° C. because of restrictions on measurement environment. Using this cell, the temperature dependence of chromaticity was measured. In addition, BM7 (manufactured by Topcon Corporation) was used in the measurement. Here, the cell thickness was set to be four kinds, 3.7 microns, 4.5 microns, 5.8 microns and 9.0 microns.

Results on the respective cell thicknesses are shown in FIGS. 5 to 8. As shown in FIGS. 5 to 8, it was confirmed that the temperature dependence was not seen in the colors displayed under the drive conditions of 3 V.

Figure 5:
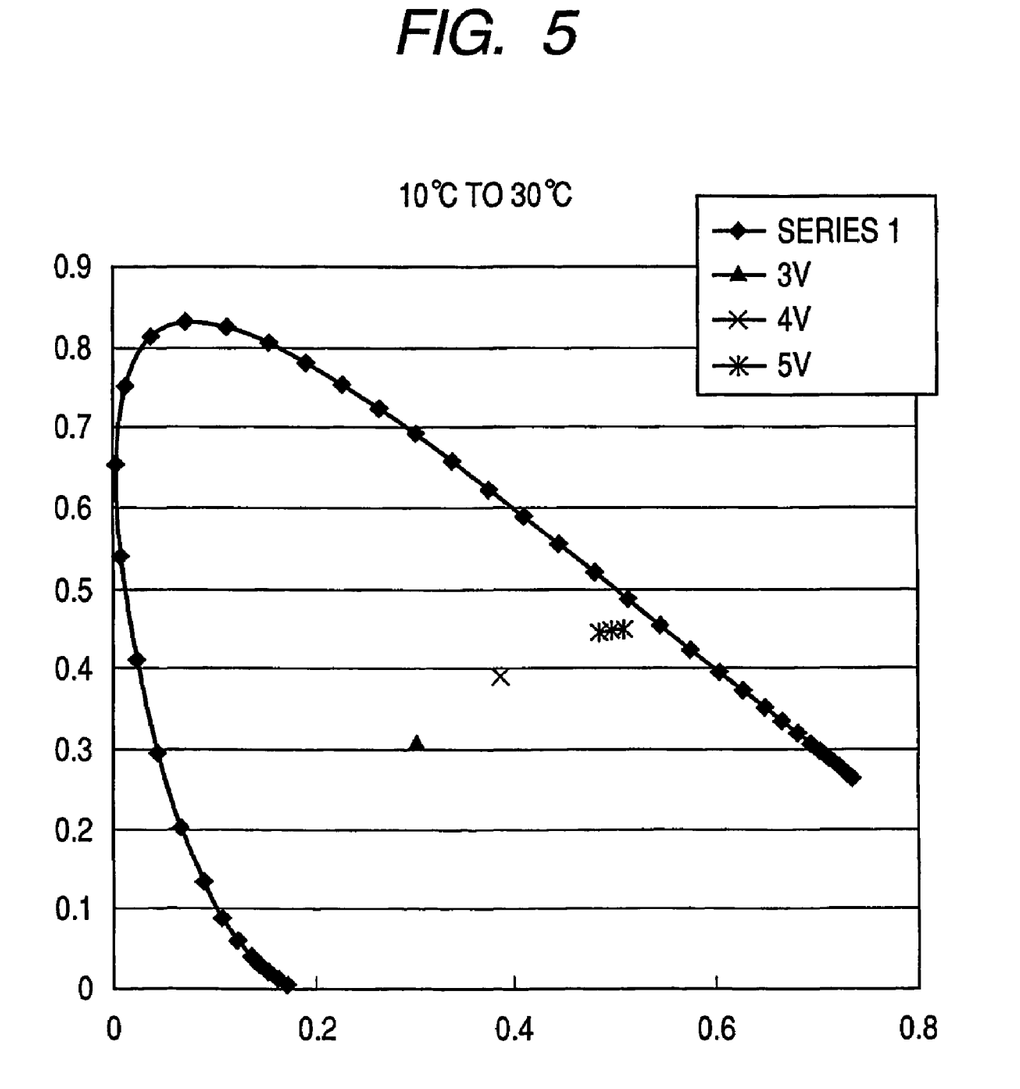
FIG. 5 is a graph showing the results of measurement of the temperature dependence of color tones where the cell thickness of a liquid crystal element of the liquid crystal display device is 3.7 microns.

In FIG. 5, yellow was displayed even when 5 V was applied, showing that the device had no sufficient color display performance.

Figure 6:
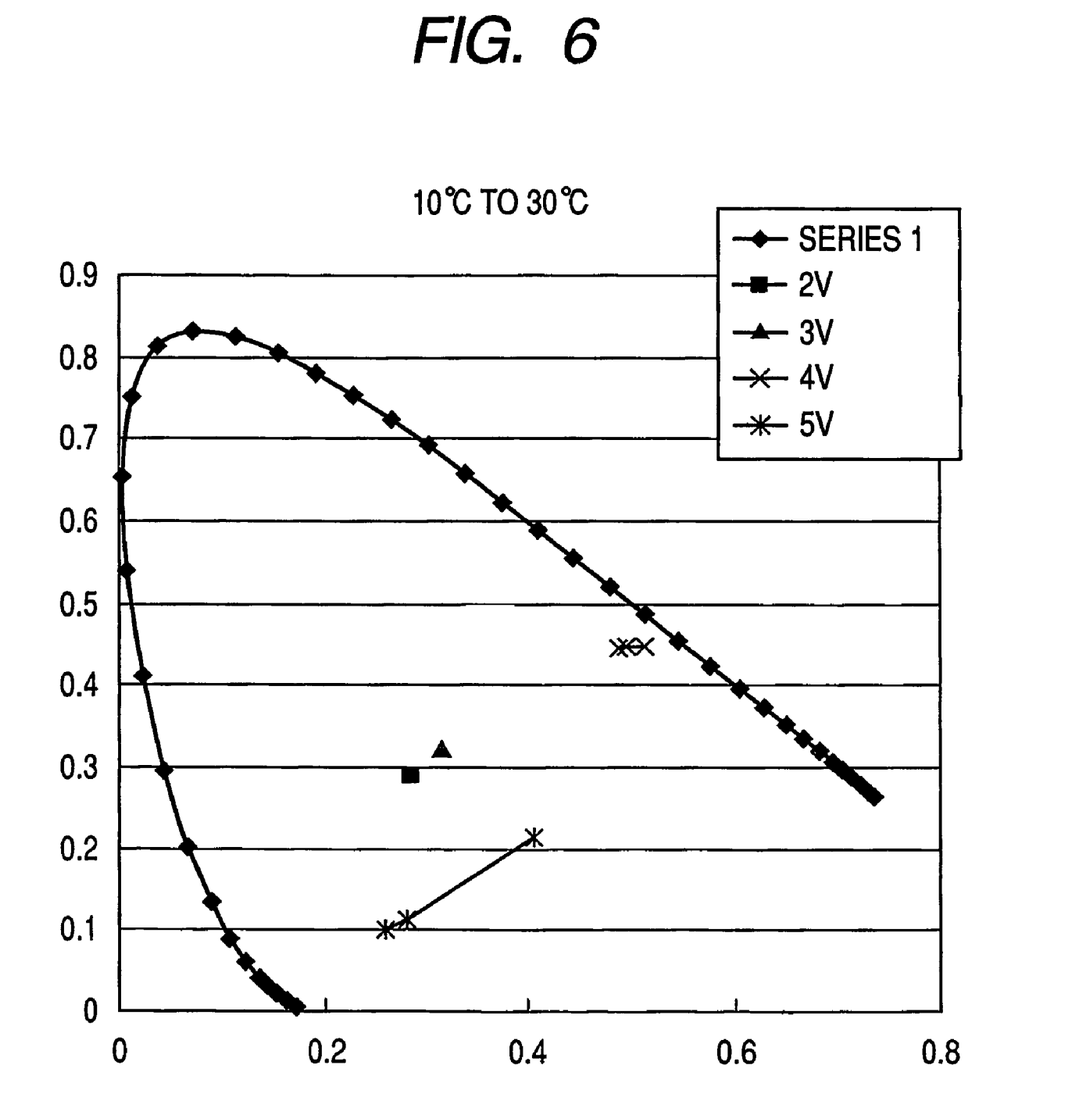
FIG. 6 is a graph showing the results of measurement of the temperature dependence of color tones where the cell thickness of a liquid crystal element of the liquid crystal display device is 4.5 microns.

In FIG. 6, it was confirmed that display colors of white→yellow→red→bluish purple were obtained by increasing the voltage, and it was confirmed by visual observation that color tones changed depending on environmental temperature when violet was displayed under application of 5 V.

Figure 7:
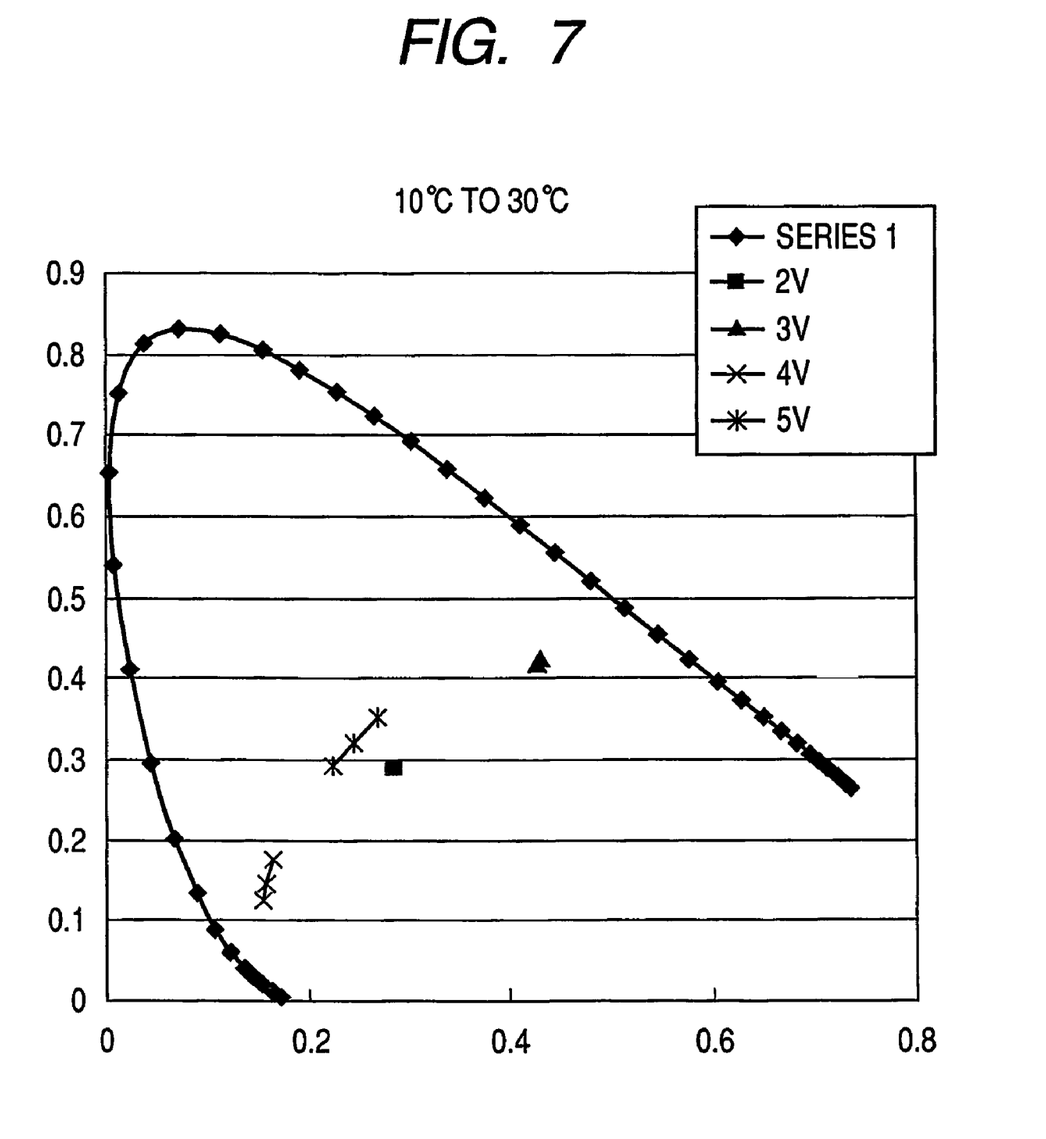
FIG. 7 is a graph showing the results of measurement of the temperature dependence of color tones where a liquid crystal element of the liquid crystal display device has a cell thickness of 5.8 microns.

In FIG. 7, it was confirmed that display colors of white→yellow→red→purple→blue were obtained by increasing the voltage.

That is, as in this Example, in the liquid crystal layer, when applying 3 V of the maximum voltage value in the voltage range in which the rate of change in the retardation level R with respect to temperature T, $\Delta R/\Delta T$, becomes substantially zero under conditions of application of a voltage not lower than the threshold value of the Freedericksz transition, the color displayed is present in the region that satisfies two expressions, x>0.4 and y<0.45, in the xy chromaticity coordinates, i.e., the region in which the color is red or purple.

Thus, inasmuch as the display color is present in the red or purple region when voltage is applied at the maximum voltage value, and where the cell thickness is set to 5.8 microns, it is possible to provide (a) a liquid crystal element in which the temperature dependence of color tones is not visible, and (b) a liquid crystal display device having such an element.

In addition, as being seen in the drawing, the results show that the temperature dependence was present on the chromaticity coordinates when blue was displayed under application of 4 V. However, any changes corresponding thereto were not detected in visual observation. Also, as to its response manner as well, a good performance was shown, and animation display, text scrolling and so forth were on the level of no problem in practical use.

Figure 8:
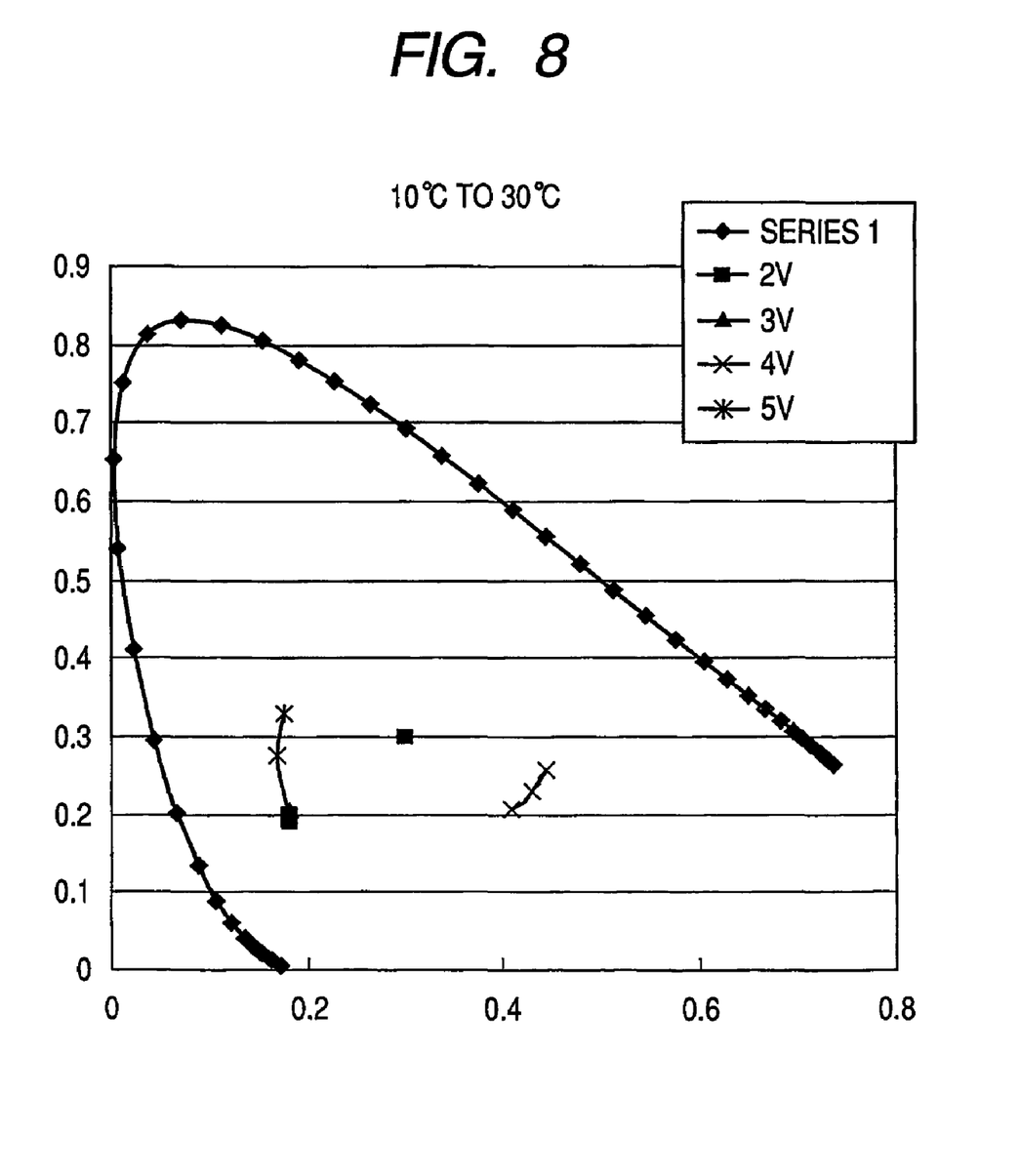
FIG. 8 is a graph showing the results of measurement of the temperature dependence of color tones where the cell thickness of a liquid crystal element of the liquid crystal display device is 9.0 microns.

In FIG. 8, it was confirmed that display colors of white→yellow→red→purple→blue were obtained by increasing the voltage. Also, on the chromaticity coordinates, blue was displayed under application of 3 V and good results were obtained in which no temperature dependence was seen in all the display colors. However, in visual observation of its response manner, the response speed was found to be too low to adapt to animation display or text. scrolling.

Thus, in this Example, it was confirmed that when the cell thickness is 5.8 microns, the temperature dependence of color tones is not visible and an appropriate response speed is obtainable.

EXAMPLE 3

Figure 9:
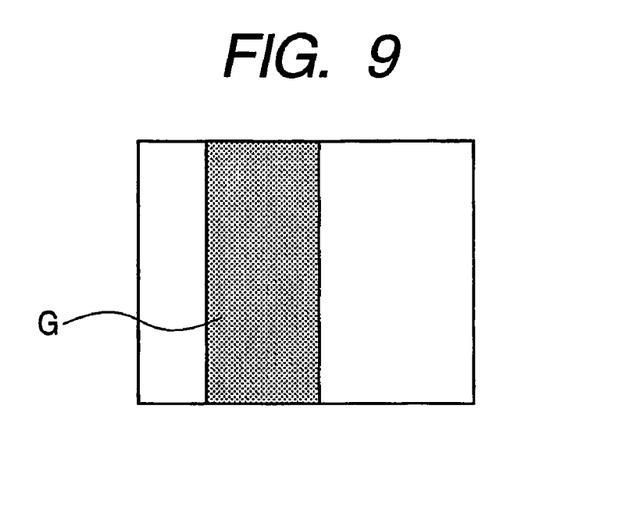
FIG. 9 is a view showing the pixel structure of a liquid crystal element of the liquid crystal display device.

A cell was used in which the cell thickness of the active-matrix cell of Example 2 was set to 5.8 microns and a green color filter was provided in one subpixel of each pixel in the cell. Here, three subpixels constituting 800×600 pixels (SVGA) were each constituted as shown in FIG. 9. That is, one subpixel was a subpixel with a green color filter, and the remaining two subpixels were so disposed as to be in an area ratio of 1:2.

As a result, it was ascertained that all the primary colors RGB were able to be displayed. It was also ascertained that the color tones obtained did not change depending on temperature.

As described above, this Example showed that an ECB color liquid crystal element can be materialized in which no temperature dependence of color tones is visible.

In the foregoing explanation, the reflection type liquid crystal element has been described. However, the present invention is not limited thereto, and as a matter of course, the present invention is also applicable also to the transparent type liquid crystal element and the semitransparent type liquid crystal element. Also, in place of the TFTs used as the driving means, MIM elements may be used or a simple matrix structure may be employed. Such a driving method may be used.

As described above, as in the present invention, in the nematic liquid crystal layer having negative dielectric constant anisotropy in which a voltage range is present in which the rate of change in the retardation level R with respect to temperature T, $\Delta R/\Delta T$, is substantially zero under conditions of application of a voltage not lower than the threshold value of the Freedericksz transition, the color displayed when voltage is applied at a maximum voltage value in the voltage range in which the rate of change, $\Delta R/\Delta T$, is substantially zero, may be made to be red or purple, thereby lessening to the utmost the change of display color caused by change in temperature.

The invention claimed is:

1. A liquid crystal display device comprising:
a polarizing plate;
a pair of substrates, at least one of which is transparent;
a pair of electrodes; and
a nematic liquid crystal, said nematic liquid crystal:
(a) being filled between the pair of substrates;
(b) being aligned to be substantially perpendicular to the substrates when a voltage applied to the pair of electrodes is zero or not higher than a threshold value;
(c) having negative dielectric constant anisotropy;
(d) undergoing change in tilt angle of alignment with respect to the substrates in accordance with the applied voltage higher than the threshold value; and
(e) displaying colors of red, purple, and blue according to a retardation of the nematic liquid crystal which varies with the change of the tilt angle,
wherein a rate of change in the retardation with respect to temperature becomes zero at an applied voltage, and
wherein the displayed color is red or purple when the voltage at which the rate of change in the retardation with respect to temperature becomes zero is applied.

2. The liquid crystal display device according to claim 1, wherein the color of red or purple is displayed when the voltage at which the rate of change in the retardation with respect to temperature becomes zero is applied, and coordinates of the color in the xy chromaticity coordinates satisfy x>0.4 and y<0.45.

3. The liquid crystal display device according to claim 1, which displays blue at an applied voltage higher than the voltage at which the rate of change in the retardation with respect to temperature becomes zero.

4. The liquid crystal display device according to claim 1, which displays green by using a color filter.

5. The liquid crystal display device according to any one of claims 1 to 4, which displays black when no voltage is applied.

6. The liquid crystal display device according to claim 1, wherein the liquid crystal display device comprises a first pixel displaying colors of red, purple, and blue according to applied voltages including the voltage at which the rate of change in the retardation with respect to temperature becomes zero, and a second pixel which displays a color of a green color filter.

* * * * *